United States Patent
Smith et al.

(10) Patent No.: US 12,464,479 B2
(45) Date of Patent: Nov. 4, 2025

(54) DIFFERENTIAL TIME SYNCHRONIZATION AND SCHEDULING

(71) Applicant: Cisco Technology, Inc., San Jose, CA (US)

(72) Inventors: Malcolm Smith, Richardson, TX (US); Brian Hart, Sunnyvale, CA (US)

(73) Assignee: Cisco Technology, Inc.

( * ) Notice: Subject to any disclaimer, the term of this patent is extended or adjusted under 35 U.S.C. 154(b) by 327 days.

(21) Appl. No.: 18/060,099

(22) Filed: Nov. 30, 2022

(65) Prior Publication Data

US 2024/0179644 A1 May 30, 2024

(51) Int. Cl.
H04W 56/00 (2009.01)

(52) U.S. Cl.
CPC .................. H04W 56/001 (2013.01)

(58) Field of Classification Search
CPC .................. H04W 56/001; H04W 56/0015
See application file for complete search history.

(56) References Cited

U.S. PATENT DOCUMENTS

| 7,564,826 | B2 * | 7/2009 | Sherman | H04W 48/12 |
| | | | | 370/338 |
| 2007/0014269 | A1 | 1/2007 | Sherman et al. | |
| 2012/0252515 | A1 | 10/2012 | Tian et al. | |
| 2014/0192785 | A1 | 7/2014 | Gong | |
| 2016/0050595 | A1 | 2/2016 | Roy et al. | |
| 2018/0242394 | A1 | 8/2018 | Wong et al. | |
| 2020/0076551 | A1 | 3/2020 | Cherian et al. | |
| 2020/0214034 | A1 | 7/2020 | Li et al. | |
| 2022/0021418 | A1 | 1/2022 | Chu et al. | |

OTHER PUBLICATIONS

Wang X et al.: "IEEE 802.11s wireless mesh networks: Framework and challenges", Ad Hoc Networks, Elsevier, Amsterdam, NL, vol. 6, No. 6, Aug. 1, 2008 (Aug. 1, 2008), pp. 970-984, XP022688901, ISSN: 1570-8705, DOI: 10.1016/J.ADHOC.2007.09.003 [retrieved on Oct. 22, 2007] Section 3.3 (15 pgs).
Notification of Transmittal of the International Search Report and the Written Opinion mailed Mar. 21, 2024, in International Application No. PCT/US2023/081936 (17 pgs).

\* cited by examiner

*Primary Examiner* — Kyaw Z Soe
(74) *Attorney, Agent, or Firm* — Merchant & Gould P.C.

(57) ABSTRACT

Differential time synchronization and scheduling may be provided. A first Access Point (AP) may wirelessly receive time-base translation parameters of a second AP. The first AP and the second AP may be neighboring. Next, a first transmission schedule for the first AP and a second transmission schedule for the second AP may be maintained. Then the second transmission schedule for the second AP may be translated into a time-base of the first AP based on the time-base translation parameters of the second AP. Then the first AP may transmit based upon the first transmission schedule for the first AP and the translated second transmission schedule for the second AP.

20 Claims, 3 Drawing Sheets

DIFFERENTIAL TIME SYNCHRONIZATION AND SCHEDULING

TECHNICAL FIELD

The present disclosure relates generally to differential time synchronization and scheduling.

BACKGROUND

In computer networking, a wireless Access Point (AP) is a networking hardware device that allows a Wi-Fi compatible client device to connect to a wired network and to other client devices. The AP usually connects to a router (directly or indirectly via a wired network) as a standalone device, but it can also be an integral component of the router itself. Several APs may also work in coordination, either through direct wired or wireless connections, or through a central system, commonly called a Wireless Local Area Network (WLAN) controller. An AP is differentiated from a hotspot, which is the physical location where Wi-Fi access to a WLAN is available.

Prior to wireless networks, setting up a computer network in a business, home, or school often required running many cables through walls and ceilings in order to deliver network access to all of the network-enabled devices in the building. With the creation of the wireless AP, network users are able to add devices that access the network with few or no cables. An AP connects to a wired network, then provides radio frequency links for other radio devices to reach that wired network. Most APs support the connection of multiple wireless devices. APs are built to support a standard for sending and receiving data using these radio frequencies.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Figure 1:
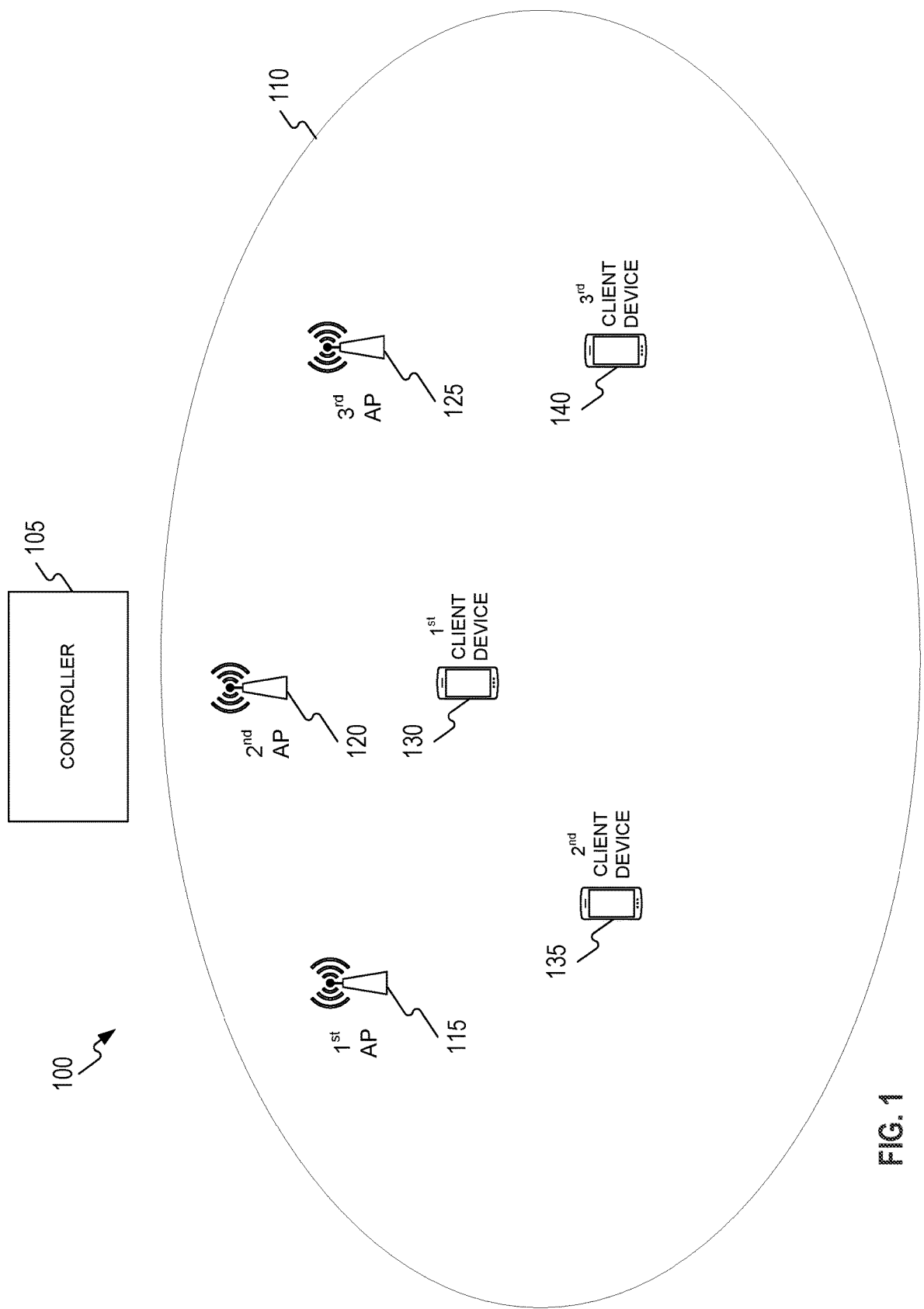
FIG. 1 is a block diagram of an operating environment for providing differential time synchronization and scheduling.

Differential time synchronization and scheduling may be provided. A first Access Point (AP) may wirelessly receive time-base translation parameters of a second AP. The first AP and the second AP may be neighboring. Next, a first transmission schedule for the first AP and a second transmission schedule for the second AP may be maintained. Then the second transmission schedule for the second AP may be translated into a time-base of the first AP based on the time-base translation parameters of the second AP. Then the first AP may transmit based upon the first transmission schedule for the first AP and the translated second transmission schedule for the second AP.

Both the foregoing overview and the following example embodiments are examples and explanatory only and should not be considered to restrict the disclosure's scope, as described and claimed. Furthermore, features and/or variations may be provided in addition to those described. For example, embodiments of the disclosure may be directed to various feature combinations and sub-combinations described in the example embodiments.

EXAMPLE EMBODIMENTS

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

A network may comprise many (e.g., hundreds) of Access Points (APs) across a floor, building, or campus that many need to be scheduled. Within this network, the APs may only be in range of a subset of the total set of APs and may be connected to different core, distribution, and edge switches. Scheduling may include Spatial Reuse (SR) where possible, and taking turns (e.g., Time-Division Multiple Access (TDMA)) otherwise. Each AP may have its own oscillator with some individual, time-varying offset. It may be difficult to get a precise agreement on a common time-base. For instance, in some SR scenarios it may be desirable for Transmit Opportunities (TXOPs) start within, for example: i) 1 μs Station-to-Station (e.g., so that Automatic Gain Control (AGC)/Start of Packet (SOP) may perceive a single start Physical layer Protocol Data Unit (PPDU); ii) at least within 16 μs Station-to-Station (e.g., so no Legacy Signal (LSIG) may be decoded); or iii) at least within 40 μs Station-to-Station (so no Clear to Send to self may be decoded).

Conventional approaches have limitation. For example, some conventional approaches may require a precise common time-base, across a switched network with variable, unknown buffering delays. Other conventional approaches may require a centralized scheduler, which may not scale well. Yet other conventional approaches using all-wireless protocols (e.g., the Wi-Fi7 SIG protocol) may have higher overheads than protocols that maximize wired messaging wherever possible. Furthermore, some conventional approaches may be intolerant to milliseconds of wired AP to AP delay. Accordingly, embodiments of the disclosure may provide a distributed time-based scheduling of APs without a common time-base that promotes SR where possible and TDMA otherwise, using Timing Synchronization Function (TSF) in beacons to translate timestamps where other messages sent over the wire for efficiency.

FIG. 1 shows an operating environment 100 for providing differential time synchronization and scheduling. As shown in FIG. 1, operating environment 100 may comprise a controller 105 and a coverage environment 110. Coverage environment 110 may comprise, but is not limited to, a Wireless Local Area Network (WLAN) comprising a plurality of Access Points (APs) that may provide wireless network access (e.g., access to the WLAN for client devices). The plurality of APs may comprise a first AP 115, a second AP 120, a third AP 125. The plurality of APs may provide wireless network access to a plurality of client devices as they move within coverage environment 110. The plurality of client devices may comprise, but are not limited to, a first client device 130, a second client device 135, and a third client device 140. Ones of the plurality of client devices may comprise, but are not limited to, a smart phone, a personal computer, a tablet device, a mobile device, a telephone, a remote control device, a set-top box, a digital video recorder, an Internet-of-Things (IoT) device, a network computer, a router, Virtual Reality (VR)/Augmented Reality (AR) devices, or other similar microcomputer-based device. Each of the plurality of APs may be compatible with specification standards such as, but not limited to, the Institute of Electrical and Electronics Engineers (IEEE) 802.11ax specification standard for example.

Controller 105 may comprise a Wireless Local Area Network controller (WLC) and may provision and control coverage environment 110 (e.g., a WLAN). Controller 105 may allow first client device 130, second client device 135, and third client device 140 to join coverage environment 110. In some embodiments of the disclosure, controller 105 may be implemented by a Digital Network Architecture Center (DNAC) controller (i.e., a Software-Defined Network (SDN) controller) that may configure information for coverage environment 110 in order to provide differential time synchronization and scheduling.

The elements described above of operating environment 100 (e.g., controller 105, first AP 115, second AP 120, third AP 125, first client device 130, second client device 135, or third client device 140) may be practiced in hardware and/or in software (including firmware, resident software, microcode, etc.) or in any other circuits or systems. The elements of operating environment 100 may be practiced in electrical circuits comprising discrete electronic elements, packaged or integrated electronic chips containing logic gates, a circuit utilizing a microprocessor, or on a single chip containing electronic elements or microprocessors. Furthermore, the elements of operating environment 100 may also be practiced using other technologies capable of performing logical operations such as, for example, AND, OR, and NOT, including but not limited to, mechanical, optical, fluidic, and quantum technologies. As described in greater detail below with respect to FIG. 3, the elements of operating environment 100 may be practiced in a computing device 300.

Figure 2:
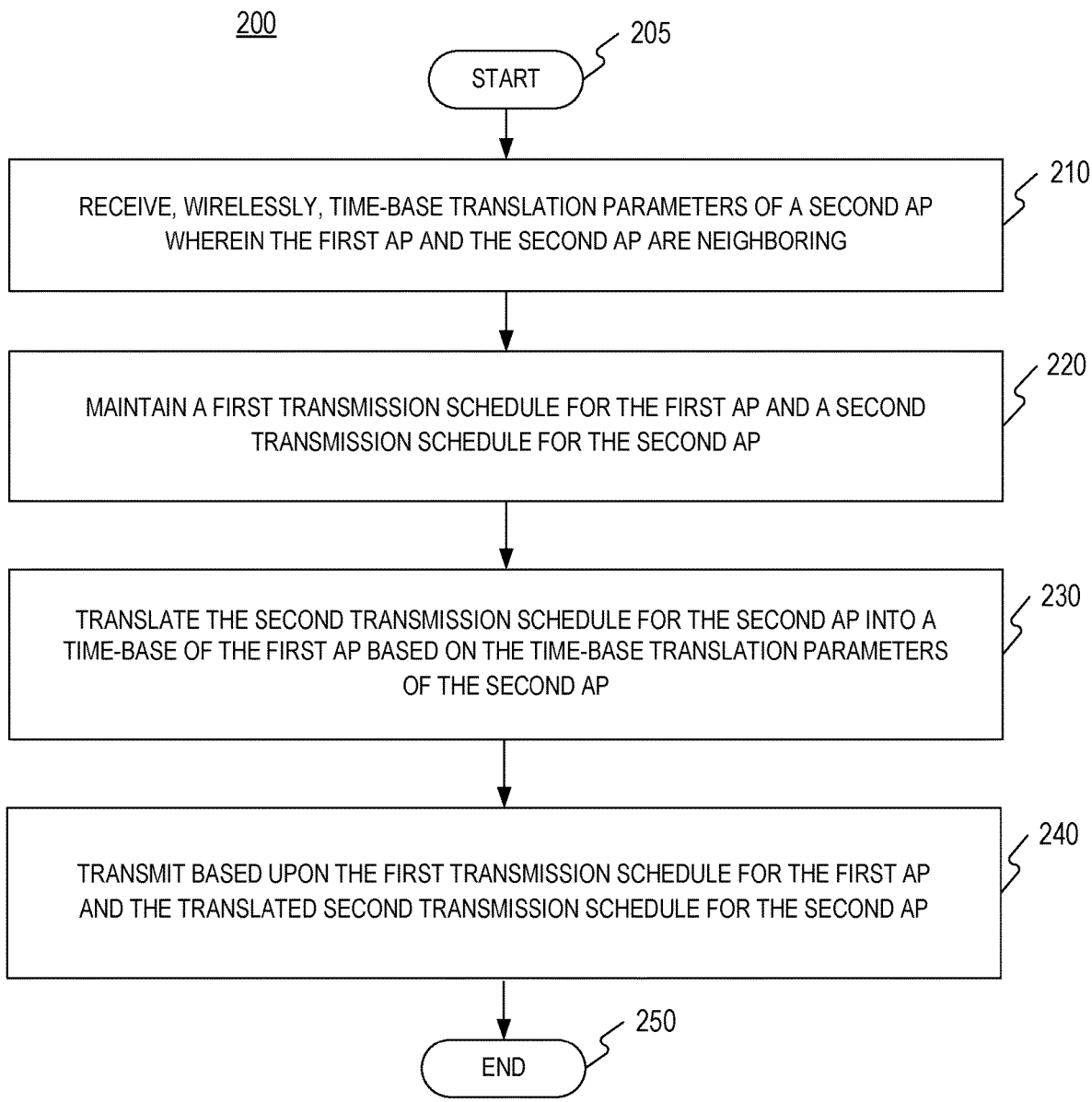
FIG. 2 is a flow chart of a method for providing differential time synchronization and scheduling.

FIG. 2 is a flow chart setting forth the general stages involved in a method 200 consistent with embodiments of the disclosure for providing differential time synchronization and scheduling. Method 200 may be implemented using a first AP 115 as described in more detail below with respect to FIG. 1. Ways to implement the stages of method 200 will be described in greater detail below.

Method 200 may begin at starting block 205 and proceed to stage 210 where first AP 115 may wirelessly receive time-base translation parameters of second AP 120. First AP 115 and second AP 120 may be neighboring. For example, first AP 115 may see second AP 120, but not third AP 125. Second AP 120 may see both first AP 115 and third AP 125. Third AP 125 may see second AP 120, but not first AP 115.

First AP 115 may receive a beacon from second AP 120 that contains time-base translation parameters for second AP 120. First AP 115 may then determine a TSF offset and drift of second AP 120 with respect to first AP 115 based on the received time-base translation parameters of second AP 120. Second AP 120 may receive a beacon from first AP 115 that contains time-base translation parameters for first AP 115 and may receive a beacon from third AP 125 that contains time-base translation parameters for third AP 125. Second AP 120 may then determine a TSF offset and drift of first AP 115 with respect to second AP 120 based on the received time-base translation parameters of first AP 115. Second AP 120 may also determine a TSF offset and drift of third AP 125 with respect to second AP 120 based on the received time-base translation parameters of third AP 125. Third AP 125 may receive a beacon from second AP 120 that contains time-base translation parameters for second AP 120. Third AP 125 may then determine a TSF offset and drift of second AP 120 with respect to third AP 125 based on the received time-base translation parameters of second AP 120. Accordingly, the plurality of APs may track the TSF of neighboring APs and maintain translation parameters comprising, for example, an (offset, gradient)-tuple.

Embodiments of the disclosure may be robust with respect to missing beacons. For example, embodiments of the disclosure may use all received beacons during the last N beacon intervals. If less than two are available, then the most recent two beacons may be used. Otherwise it may use the most recent one beacon.

From stage 210, where first AP 115 wirelessly receives time-base translation parameters of second AP 120, method 200 may advance to stage 220 where first AP 115 may maintain a first transmission schedule for first AP 115 and a second transmission schedule for second AP. For example, the plurality of APs may send their own resource (i.e., slot sequence) add/delete/change messages to neighboring cochannel APs. These messages may be forwarded to neighbors of the neighbors (e.g., second AP 120 may forward first AP 115's messages to third AP 125). The time-base used in these messages may indicate the slot start times using the AP's own TSF.

These resource requests may be chosen to minimize collisions with neighbors' agreed resource allocations (especially higher priority allocations) and may also maximize collisions with the allocations of neighbors of neighbors. Maximizing collisions with the allocations of neighbors of neighbors may promote efficient SR.

Once first AP 115 first AP 115 maintains the first transmission schedule for first AP 115 and the second transmission schedule for second AP 120 in stage 220, method 200 may continue to stage 230 where first AP 115 may translate the second transmission schedule for second AP 120 into a time-base of first AP 115 based on the time-base translation parameters of second AP 120. For example, each of the plurality of APs may maintain a unique schedule (i.e., agreed resource allocations comprising slot sequences) for themselves, of their neighboring cochannel APs, and, in in some embodiments, of their neighbor of neighboring cochannel APs also. Each AP may maintain its schedule using a single time-base, for example, the AP's own TSF time-base. The schedules may be unique to each AP because different APs may have different neighbors. Recipient APs (e.g., first AP 115) may be responsible for translating the schedule of the requester AP (e.g., second AP 120) into the recipient's own time-base.

After first AP 115 translates the second transmission schedule for second AP 120 into a time-base of first AP 115 based on the time-base translation parameters of second AP 120 in stage 230, method 200 may proceed to stage 240 where first AP 115 may transmit based upon the first transmission schedule for first AP 115 and the translated second transmission schedule for second AP 120. For example, because the transmission schedule may now be on first AP 115's time-base, the transmissions may be synchronized. Once first AP 115 transmits based upon the first transmission schedule for first AP 115 and the translated second transmission schedule for second AP 120 in stage 240, method 200 may then end at stage 250.

Consistent with embodiments of the disclosure, for the case where two APs solicit resources at much the same time and the requests overlap, resource requests may have a tie-breaker process. Both requester and recipient may run the tie-breaker process and independently come to the same conclusion.

Priority (e.g., Access Class (AC)/Traffic Identifier (TID)) may be important, so overlapping requests for the same resources may be resolved, for example, via: i) AC/TID priority; then ii) first-come-first-served; iii) no or some randomness if the request times match; then iv) the AP Media Access Control (MAC) address to guarantee ties may be impossible (e.g., the randomness may avoid a penalty to certain MAC addresses).

$$2^{64}*requestTime+2^{48}*(16bRandomNumberToMost-lyAvoidDraws)+macAddress$$

There may be an "Extended TID" too, that may describe 10 traffic IDs for: mission critical Quality of Service (QOS) flows>beacon flows>normal 8 TIDs.

Consistent with embodiments of the disclosure, resource requests may be added, changed, or deleted. Resource requests may partially or fully overlap. Fully overlapped requests may fail and a failure message may be sent to the requester so the requester may know to try again. In one embodiment, partially overlapped requests may also fail and a failure message may be sent to the requester so the requester may know to try again. In another embodiment, a recipient determining that a request only partially loses against another pre-existing or overlapped request allows and keeps the resource request, but for the non-preempted time only. The recipient also sends a "partially failed" message to the requester, so the requester knows the limitations and/or may attempt to change the request.

APs may send a high priority resource request for their beacons. Also, APs may send a medium priority resource request for their Delivery Traffic Indication Message (DTIM) traffic. Because different APs may calculate slightly different TSF translation parameters, slots/slot sequences may have some (e.g., 4 μs) guard time between them.

If an AP is going to change channel, it may have to deal with new slot sequences (e.g., may be sent ahead of time via the wire) and unknown TSF translation parameters. The unknown TSF parameters may be learned as quickly as possible. The AP may perform some off-channel scans of the new channel beforehand, to hear an AP's beacon once or a few times. The heard AP may share its own sets of translation parameters over the wire, so then the AP may be synchronized with all APs immediately after the channel change. In the alternative, the AP about to change channel may scan one or more times, but collectively for long enough to hear 1 or a few beacons from all nearby APs on the destination.

Figure 3:
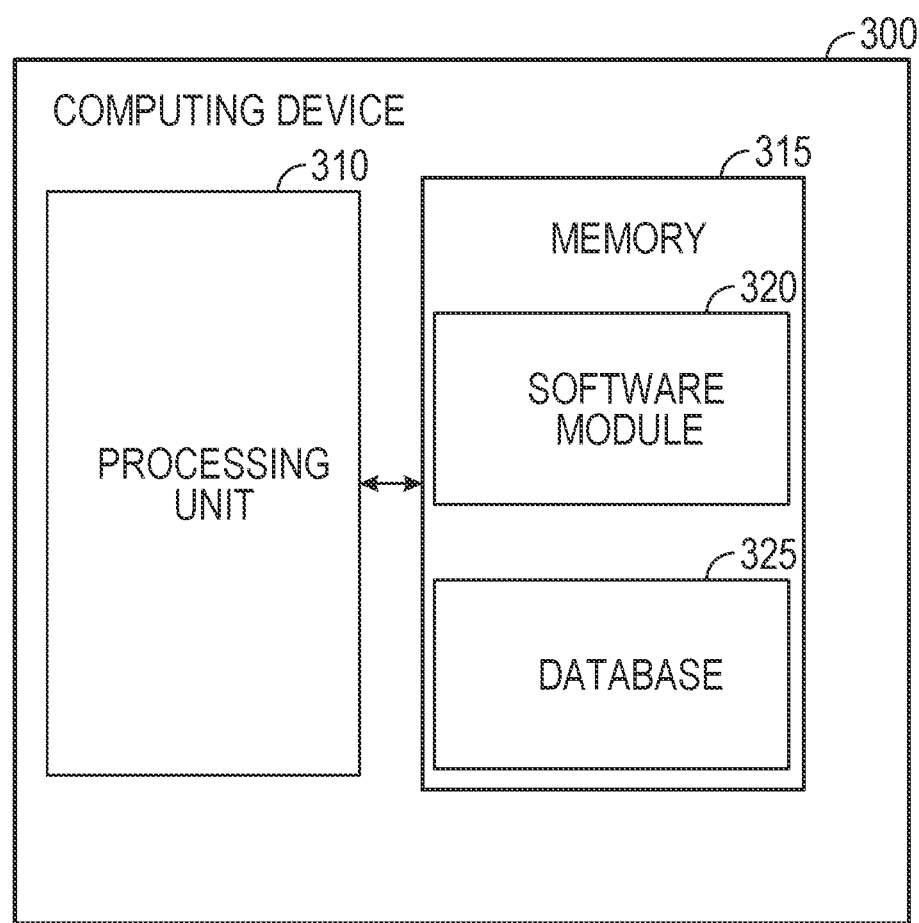
FIG. 3 is a block diagram of a computing device.

FIG. 3 shows computing device 300. As shown in FIG. 3, computing device 300 may include a processing unit 310 and a memory unit 315. Memory unit 315 may include a software module 320 and a database 325. While executing on processing unit 310, software module 320 may perform, for example, processes for providing differential time synchronization and scheduling as described above with respect to FIG. 2. Computing device 300, for example, may provide an operating environment for controller 105, first AP 115, second AP 120, third AP 125, first client device 130, second client device 135, or third client device 140. Controller 105, first AP 115, second AP 120, third AP 125, first client device 130, second client device 135, or third client device 140 may operate in other environments and are not limited to computing device 300.

Computing device 300 may be implemented using a Wi-Fi access point, a tablet device, a mobile device, a smart phone, a telephone, a remote control device, a set-top box, a digital video recorder, a cable modem, a personal computer, a network computer, a mainframe, a router, a switch, a server cluster, a smart TV-like device, a network storage device, a network relay device, or other similar microcomputer-based device. Computing device 300 may comprise any computer operating environment, such as hand-held devices, multiprocessor systems, microprocessor-based or programmable sender electronic devices, minicomputers, mainframe computers, and the like. Computing device 300 may also be practiced in distributed computing environments where tasks are performed by remote processing devices. The aforementioned systems and devices are examples, and computing device 300 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the element illustrated in FIG. 1 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 300 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:
   receiving wirelessly, by a first Access Point (AP), time-base translation parameters of a second AP wherein the first AP and the second AP are neighboring;
   maintaining a first transmission schedule for the first AP and a second transmission schedule for the second AP;
   translating, by the first AP, the second transmission schedule for the second AP into a time-base of the first AP based on the time-base translation parameters of the second AP; and
   transmitting, by the first AP, based upon the first transmission schedule for the first AP and the translated second transmission schedule for the second AP.

2. The method of claim 1, wherein receiving the time-base translation parameters of the second AP comprises receiving the time-base translation parameters of the second AP from the second AP.

3. The method of claim 1, wherein receiving the time-base translation parameters of the second AP comprises receiving the time-base translation parameters of the second AP in a beacon received from the second AP.

4. The method of claim 1, wherein the time-base translation parameters comprise a Timing Synchronization Function (TSF) offset of the second AP.

5. The method of claim 1, wherein maintaining the first transmission schedule for the first AP and the second transmission schedule for the second AP comprises exchanging resource requests with the second AP configured to minimize collisions between the first AP and the second AP wherein the first AP constructs the first transmission schedule for the first AP and the second AP constructs the second transmission schedule for the second AP based on the exchanged resource requests.

6. The method of claim 5, wherein exchanging the resource requests with the second AP is further configured to maximize collisions between the first AP and a third AP, wherein the second AP is a neighbor of the third AP and the first AP is not a neighbor of the third AP.

7. The method of claim 1, further comprising receiving time-base translation parameters of the first AP in a beacon received from the first AP at the second AP.

8. A system comprising:
   a memory storage; and
   a processing unit disposed in a first Access Point (AP) and coupled to the memory storage, wherein the processing unit is operative to:
      receive, wirelessly, time-base translation parameters of a second AP wherein the first AP and the second AP are neighboring;
      maintain a first transmission schedule for the first AP and a second transmission schedule for the second AP;
      translate the second transmission schedule for the second AP into a time-base of the first AP based on the time-base translation parameters of the second AP, and
      transmit based upon the first transmission schedule for the first AP and the translated second transmission schedule for the second AP.

9. The system of claim 8, wherein the processing unit being operative to receive the time-base translation parameters of the second AP comprises the processing unit being operative to receive the time-base translation parameters of the second AP from the second AP.

10. The system of claim 8, wherein the processing unit being operative to receive the time-base translation parameters of the second AP comprises the processing unit being operative to receive the time-base translation parameters of the second AP in a beacon received from the second AP.

11. The system of claim 8, wherein the time-base translation parameters comprise a Timing synchronization function (TSF) offset of the second AP.

12. The system of claim 8, wherein the processing unit being operative to maintain the first transmission schedule for the first AP and the second transmission schedule for the second AP comprises the processing unit being operative to exchange resource requests with the second AP configured to minimize collisions between the first AP and the second AP wherein the first AP constructs the first transmission schedule for the first AP and the second AP constructs the second transmission schedule for the second AP based on the exchanged resource requests.

13. The system of claim 12, wherein the processing unit being operative to exchange the resource requests with the second AP is further configured to maximize collisions between the first AP and a third AP, wherein the second AP is a neighbor of the third AP and the first AP is not a neighbor of the third AP.

14. A non-transitory computer-readable medium that stores a set of instructions which when executed perform a method executed by the set of instructions comprising:
- receiving wirelessly, by a first Access Point (AP), time-base translation parameters of a second AP wherein the first AP and the second AP are neighboring;
- maintaining a first transmission schedule for the first AP and a second transmission schedule for the second AP;
- translating, by the first AP, the second transmission schedule for the second AP into a time-base of the first AP based on the time-base translation parameters of the second AP; and
- transmitting, by the first AP, based upon the first transmission schedule for the first AP and the translated second transmission schedule for the second AP.

15. The non-transitory computer-readable medium of claim 14, wherein receiving the time-base translation parameters of the second AP comprises receiving the time-base translation parameters of the second AP from the second AP.

16. The non-transitory computer-readable medium of claim 14, wherein receiving the time-base translation parameters of the second AP comprises receiving the time-base translation parameters of the second AP in a beacon received from the second AP.

17. The non-transitory computer-readable medium of claim 14, wherein the time-base translation parameters comprise a Timing synchronization function (TSF) offset of the second AP.

18. The non-transitory computer-readable medium of claim 14, wherein maintaining the first transmission schedule for the first AP and the second transmission schedule for the second AP comprises exchanging resource requests with the second AP configured to minimize collisions between the first AP and the second AP wherein the first AP constructs the first transmission schedule for the first AP and the second AP constructs the second transmission schedule for the second AP based on the exchanged resource requests.

19. The non-transitory computer-readable medium of claim 18, wherein exchanging the resource requests with the second AP is further configured to maximize collisions between the first AP and a third AP, wherein the second AP is a neighbor of the third AP and the first AP is not a neighbor of the third AP.

20. The non-transitory computer-readable medium of claim 14, further comprising receiving time-base translation parameters of the first AP in a beacon received from the first AP at the second AP.

* * * * *